United States Patent [19]

King

[11] Patent Number: 5,697,288

[45] Date of Patent: Dec. 16, 1997

[54] ENCAPSULATING COFFEE BETWEEN TWO LAYERS OF PAPER

[76] Inventor: Alan M. King, 465 Cote St. Antoine Rd., Westmount, H3Y 2K1, Canada

[21] Appl. No.: 639,729

[22] Filed: Apr. 29, 1996

[51] Int. Cl.[6] .................................................. A47J 31/24
[52] U.S. Cl. .......................... 99/289 T; 99/295; 99/302 P
[58] Field of Search ........................ 99/289 T, 289 R, 99/295, 302 P; 426/433

[56] References Cited

U.S. PATENT DOCUMENTS

| | | |
|---|---|---|
| 2,786,408 | 3/1957 | Herrera . |
| 3,122,988 | 3/1964 | Rota . |
| 3,143,954 | 8/1964 | Nesmith . |
| 3,208,369 | 9/1965 | Greenly et al. . |
| 4,133,354 | 1/1979 | Lerner et al. . |
| 4,353,293 | 10/1982 | Illy ................................ 99/289 T |
| 4,426,919 | 1/1985 | Rhoten . |
| 4,632,023 | 12/1986 | King . |
| 4,713,253 | 12/1987 | Stone, Jr. . |
| 4,713,526 | 12/1987 | Smit . |
| 4,791,859 | 12/1988 | King . |
| 4,903,586 | 2/1990 | King ................................... 99/287 |
| 4,922,809 | 5/1990 | Fühner . |
| 4,936,199 | 6/1990 | Ruggin et al. .................. 99/289 R |
| 4,967,647 | 11/1990 | King . |
| 5,309,820 | 5/1994 | Baxter et al. .................... 99/280 |
| 5,337,653 | 8/1994 | Sellers ........................... 99/289 R |
| 5,346,098 | 9/1994 | King . |
| 5,353,692 | 10/1994 | Reese et al. .................. 99/289 T |
| 5,520,093 | 5/1996 | Ackermann ................... 99/289 T |

FOREIGN PATENT DOCUMENTS 101110  10/1958  Norway ........................ 99/289 T

*Primary Examiner*—Reginald L. Alexander
*Attorney, Agent, or Firm*—Hill, Steadman & Simpson

[57] ABSTRACT

A beverage brewer with tape formed of two layers of paper between which are packets of coffee. The tape has perforations along each edge and sprockets intermittently drive the tape so as to place fresh coffee into the brewer and to remove the used coffee from the brewing chamber.

8 Claims, 3 Drawing Sheets

ENCAPSULATING COFFEE BETWEEN TWO LAYERS OF PAPER

FIELD OF THE INVENTION

This invention relates to a beverage brewing machine which brews a beverage from ground coffee or any other beverage ingredient encapsulated between two layers of a filter paper or plastic and separated into individual brewing packets. When each packet is placed in a special brewing mechanism and a cup of hot water is added, the beverage ingredient is first aerated from below for a few seconds and then the air pressure is replaced with a vacuum so as to withdraw the brewed beverage into the lower chamber to be then dispensed into a cup.

DESCRIPTION OF THE RELATED ART

Beverage brewing machines such as coffee brewers are known such as my U.S. Pat. No. 4,903,586 which includes a strip-shaped filter and has upper and lower brewing chambers with a piston mounted in the lower brewing chamber for agitating and drawing the brewed beverage through the coffee grounds and filter. See also U.S. Pat. No. 4,426,919 which has strips formed with a lower porous layer and upper water proof layer with spaced packets of coffee therebetween and with annular seals in the top layer in which is mounted a porous layer. See also U.S. Pat. Nos. 5,309,820, 5,337,653, 4,936,199, 5,353,692, 3,208,369, 3,143,954 and 3,122,988.

SUMMARY OF THE INVENTION

The present invention relates to a novel beverage brewer and a novel packet or tape in which coffee or other beverage ingredient is encapsulated between two pervious layers such as paper or plastic such that the encapsulated portion can be individually placed in the brewer, or in a multiple series of portions connected together in a tape which can be advanced into a brewing machine to allow beverage to be brewed after which the upper and lower portion of the brewing machine separate and the packet or tape with the spent coffee grounds is removed from the brewing chamber and a packet of encapsulated ground coffee is inserted or the tape moves into position for the next brewing process.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
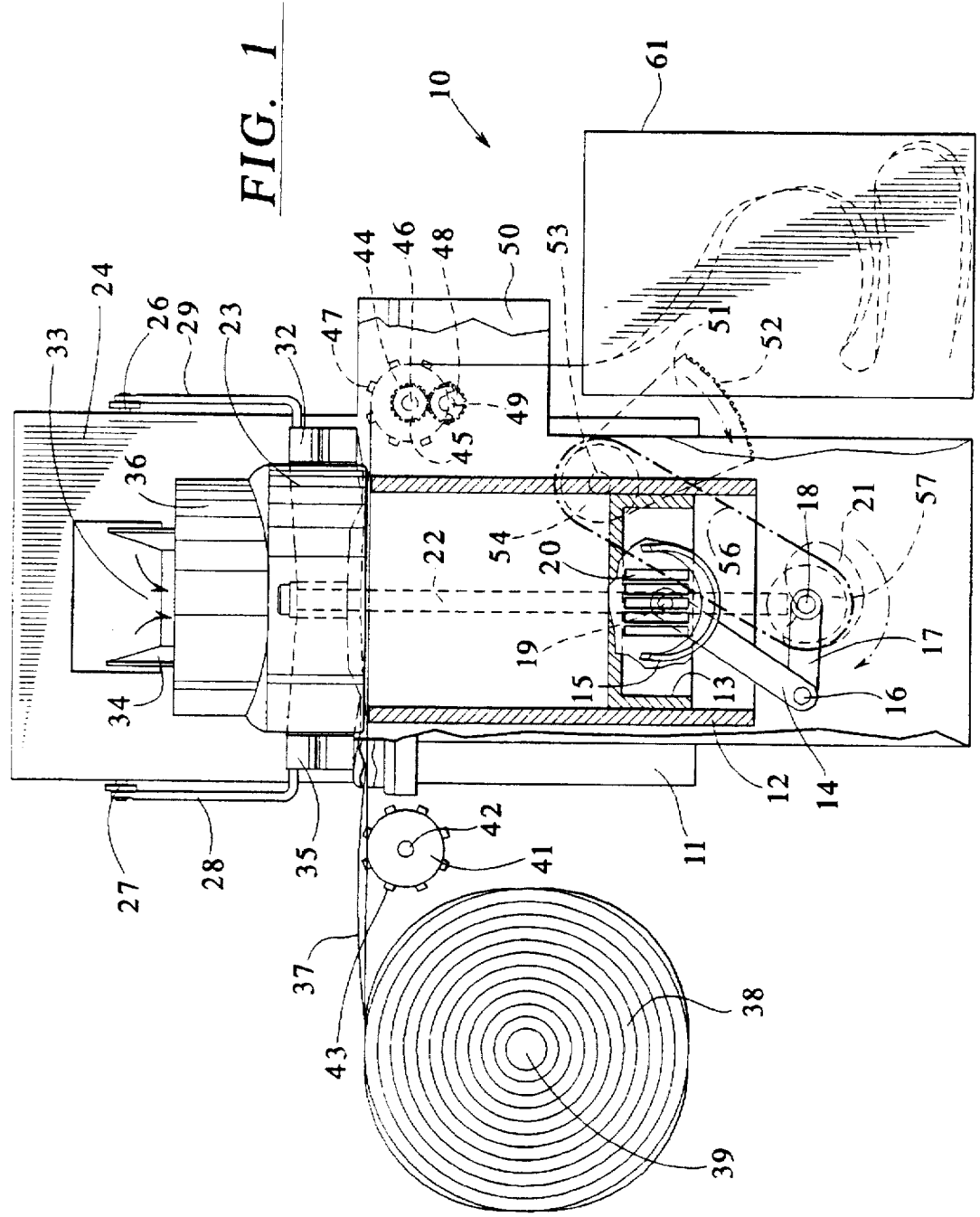
FIG. 1 is a front plan view partially in section with the upper and lower brewing chamber sealed together.
Figure 2:
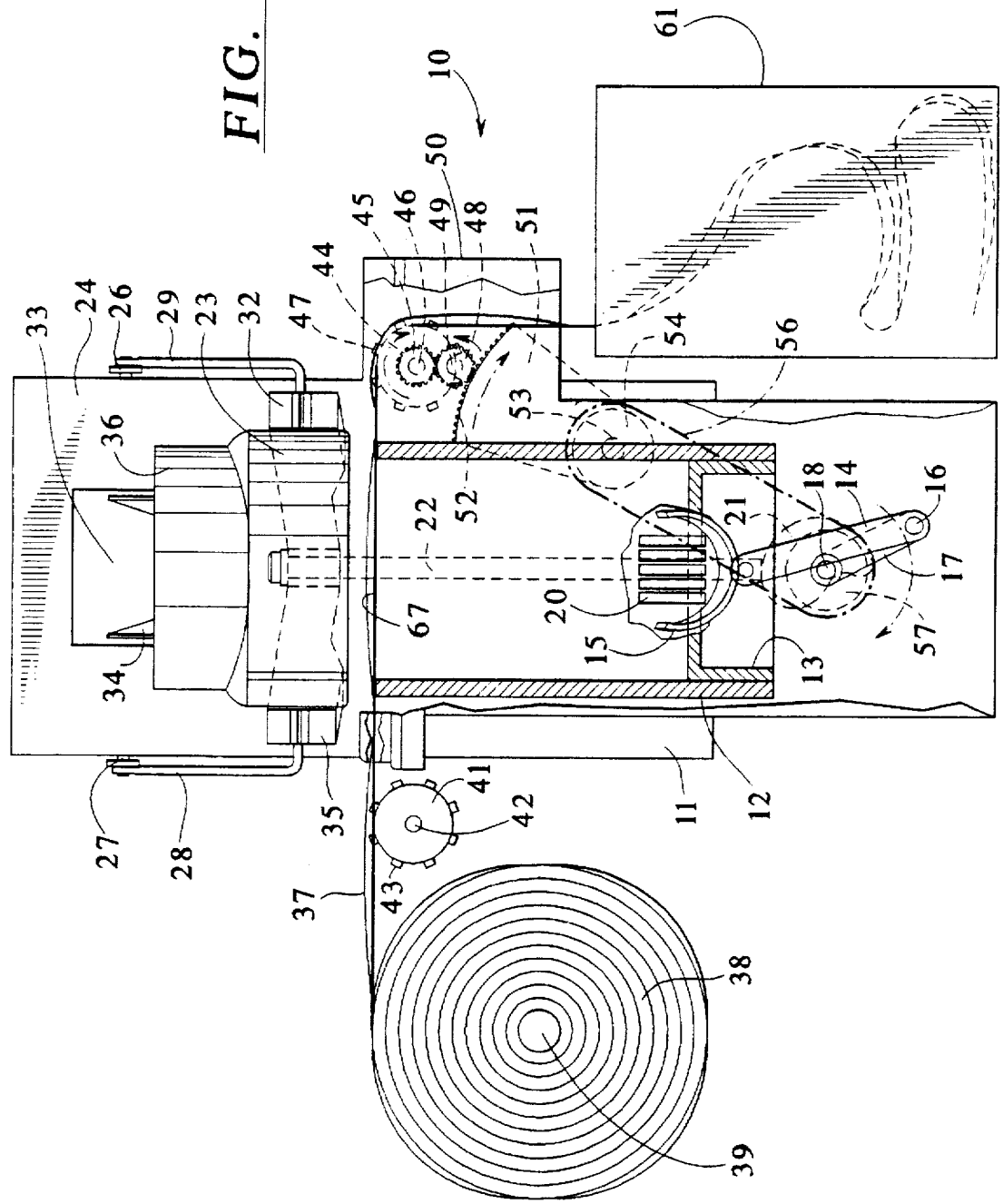
FIG. 2 is a front plan view partially in section of the brewing machine with the upper and lower brewing chamber separated.

FIGS. 1 and 2 illustrate a beverage brewer 10 which has a housing 11 that supports a main cylinder 12 of cylindrical shape in which a piston 13 is movably mounted and is connected by a wrist a pin 19 to a link 14 that is pivoted by pin 16 to an arm 17 that is driven by a shaft 18 to which a suitable driving motor, not shown, is attached. The main cylinder 12 is formed with coffee discharge slots 20 so that the coffee from the lower brewing chamber can pass to a spout 15 where it is received in a cup or other container, not shown.

Figure 3:
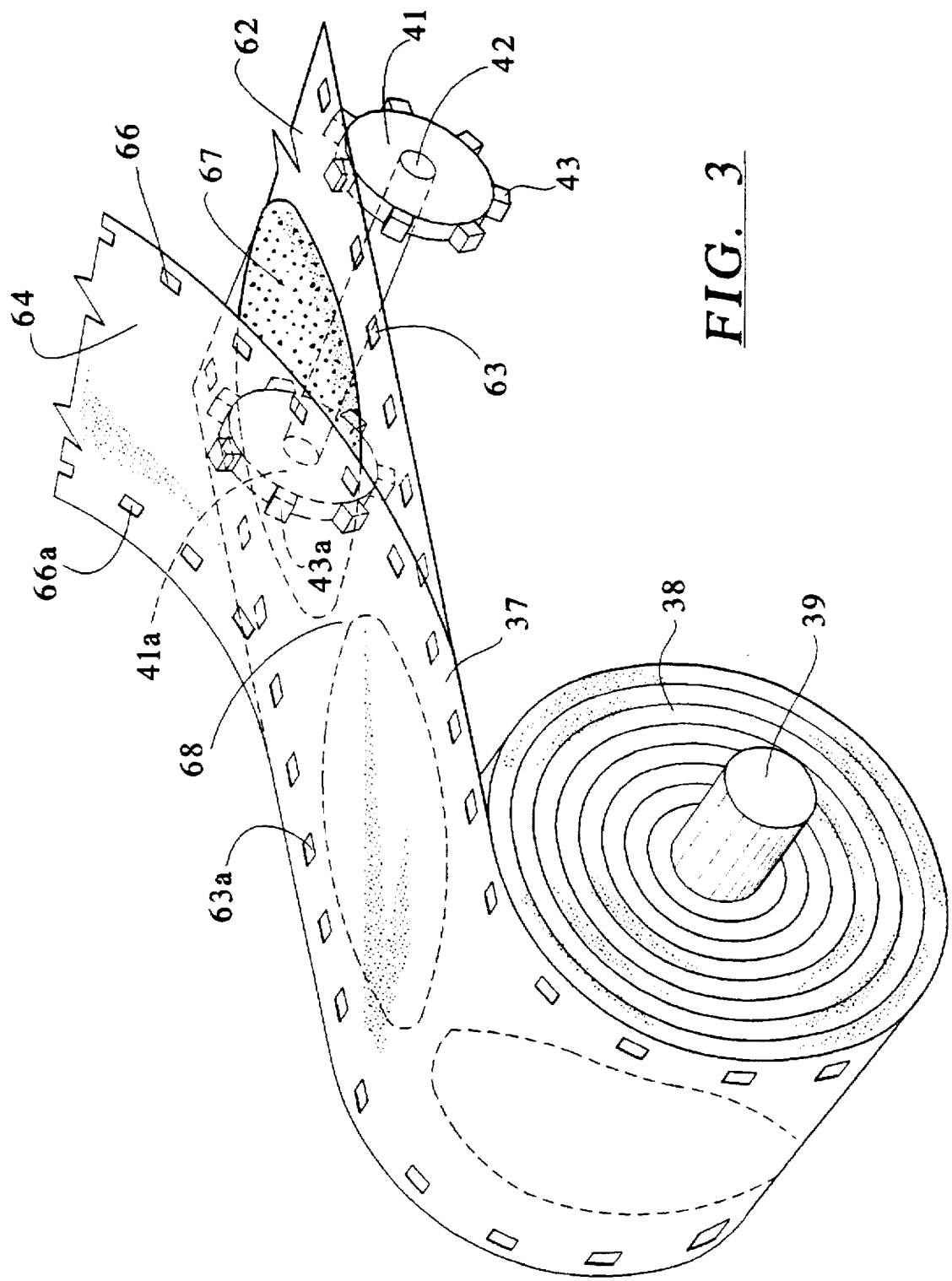
FIG. 3 is a perspective view illustrating the encapsulated tape.

An upper brewing chamber 23 is movably mounted relative to the main cylinder 12 in a manner as shown and described in my prior U.S. Pat. No. 4,903,586. A rod 22 is supported for a movable motion and has a lower end that engages a cam 21 mounted on shaft 18. A funnel 36 is connected to the upper portion of the upper brewing chamber 23 and a spout 34 periodically discharges water through an opening 33 from the water container 24 into the upper brewing chamber 23 through the spout 34. A shaft 39 is fixedly mounted relative to the housing 11 and supports a reel 38 of tape of encapsulated coffee mounted between two porous layers of paper. As shown in FIG. 3, the tape 37 passes over sprockets 41 and 41a mounted on a supporting shaft 42 which is supported by the housing 11 for rotational motion and the sprockets 41 and 41a have extensions 43 and 43a which are aligned with perforations 63, 66 and 63a, 66a in the tape 37. The tape 37 passes through the brewing chamber between the upper brewing chamber 23 and the main cylinder 12 and then passes over a second set of sprockets 44 which have projections 47 which are received in the perforations 63, 66 and 63a and 66 and 66a. The sprockets 44 are mounted on a shaft 46 and the shaft 46 is rotatably supported by the housing 11 on the opposite side of the machine to that on which the shaft 42 is supported. A gear 45 is non-rotatably attached to the shaft 46 and sprockets 44 and is in mesh with the gear 48 which is rotatably mounted on a shaft 49 supported by the housing 11.

A segment gear 51 with teeth 52 is non-rotatably mounted on a shaft 53 which carries a pulley 54 and is supported by the housing 11. A belt 56 passes over the pulley 54 and its lower end passes over a pulley 57 which is non-rotatably mounted on the shaft 18. The tape 37 passes over the sprockets 44 and through a guard 50 of the machine 10 and is received in a receptacle 61 which receives the used tape.

As shown in FIG. 3, the tape 37 comprises a lower pervious layer 62 which might be of paper. Coffee grounds 67 are attached to the lower layer 62 and an upper pervious layer 64 is attached to the lower layer 62 over the coffee grounds 67 and the upper and lower layers 62 and 64 are sealed together by adhesive or other means. Perforations 66 and 68a in the layer 64 are aligned with the perforations 63 and 63a in the lower layer 62 so that the sprockets 41 and 44 drive the tape with the projections 43 and 47 which extend through the openings 63 and 66. The coffee 67 is spaced along the tapes 62 and 64 with a spacing interval 68 therebetween such that one of the encapsulated coffee packets 67 will be within the brewing machine after each brewing cycle.

In operation, initially fresh coffee is in the brewing chamber and when the driving motor of the machine is actuated it drives shaft 18. Hot water is inserted into the upper brewing chamber 23 from the hot water tank 24 through the spout 34 and funnel 36 and as the motor shaft 18 continues to turn, the piston 13 moves upwardly to force air through the tape 37 and coffee grounds 67 and then sucks the hot water from the upper brewing chamber 23 into the main cylinder 12 through the coffee grounds and tape 37 so as to brew the coffee. The piston 13 continues its downward motion until the top of the piston 13 is below the slots 20 and the main cylinder so that the coffee then runs through the slots 20 into the spout 15 and into a suitable receptacle, as for example a cup. Then cam 21 moves shaft 22 to separate the upper brewing chamber 23 from the main cylinder 12 as shown in FIG. 2. Then, the teeth 52 of the segment gear 51 engage the teeth of the gear 48 so as to turn the sprockets 44 to drive the tape 37 so as to remove the used coffee grounds 67 and the tape 37 out of the brewing chamber so that it passes downwardly over the sprocket 44 into the receptacle 61. An unused packet 67 on the tape 37 will be moved into the brewing chamber for the next cycle. Further movement of the shaft 18 causes the push rod 22 to move downwardly so as to seal the upper brewing chamber 23 to the main cylinder 12. Then the motor stops and the brewer is ready for another brewing cycle.

It is seen that this invention provides a new and novel beverage brewer which includes a permeable tape formed of two layers of permeable material such as paper between which coffee packets 67 are mounted. The tape is formed with sprocket holes and passes over suitable sprockets which periodically drive the tape so as to remove the used coffee packets out of the brewing chamber and to move a new unused coffee packet into the machine.

An alternative method is that in opposition to using a reel of tape, a single coffee packet is manually placed within the brewing machine at the start of a brewing cycle. When the brewing cycle is complete, the used single coffee packet is manually removed and replaced with a fresh packet if desired.

Although the invention has been described with respect to preferred embodiments, it is not to be so limited as changes and modifications can be made which are within the full intended scope of the invention as defined by the appended claims.

I claim as my invention:

1. A beverage brewing machine comprising, in combination:

an upper brewing chamber adapted to receive hot water and a beverage material and having an open lower end;

a cylinder with an open upper end normally in registration with said open lower end of the upper brewing chamber;

a filter tape including layers of filter material with a beverage preparation material encapsulated between the layers of filter material wherein the beverage preparation material includes individual prepackaged portions connected continuously by the filter tape; and a sprocket engaging the filter tape to advance each of the individual prepackaged portions of the beverage preparation material to a position at which the open upper end of the cylinder is in registration with the open lower end of the brewing chamber wherein the cylinder withdraws water through the beverage preparation material producing a brewed beverage.

2. The beverage brewing machine of claim 1 further comprising:

a second sprocket that advances the filter tape.

3. The beverage brewing machine of claim 1 further comprising:

perforations along at least one edge of the filter tape engageable by the sprocket.

4. The beverage brewing machine of claim 1 further comprising:

driving means connected to the sprocket to intermittently drive the filter tape.

5. The beverage brewing machine of claim 1 further comprising:

a piston movably mounted to move up or down in the cylinder.

6. A beverage brewing machine comprising, in combination:

an upper brewing chamber adapted to receive hot water and a beverage material and having an open lower end;

a cylinder with an open upper end normally in registration with said open lower end of the upper brewing chamber; and an individual prepackaged portion of beverage preparation material which may be manually inserted into and removed from the machine wherein the beverage preparation material is placed in a suitable container open to the atmosphere and mixed with hot water wherein through the bottom of the container a positive air pressure is admitted to thoroughly agitate the mixture of the water and the beverage preparation material to leach soluble solids from the beverage preparation material and further wherein following the period that positive pressure is applied, the bottom of the container is subjected to a negative pressure to withdraw the brewed beverage from the container through the coffee packet and empty the beverage into a user's cup.

7. The beverage brewing machine of claim 6 wherein the container having the prepackaged portion of beverage preparation material is formed of first and second impervious layers which are sealed together.

8. The beverage brewing machine of claim 6 wherein the prepackaged portion is placed at the upper end of the cylinder and the lower end of the upper brewing chamber and the water is added to the upper brewing chamber.

* * * * *